May 18, 1937.　　　C. T. MORSE　　　2,081,013

HUMIDIFYING APPARATUS

Filed May 7, 1935

INVENTOR
Clark T. Morse
BY
his ATTORNEY

Patented May 18, 1937

2,081,013

UNITED STATES PATENT OFFICE 2,081,013

HUMIDIFYING APPARATUS

Clark T. Morse, Detroit, Mich., assignor to American Blower Corporation, Detroit, Mich., a corporation of Delaware Application May 7, 1935, Serial No. 20,139

10 Claims. (Cl. 261—117)

My invention relates generally to air conditioning systems, and more particularly to humidifying apparatus for such systems.

One of the objects of my invention is to provide a new and improved humidifying apparatus having a highly evaporative capacity.

Another object of my invention is to provide a humidifying apparatus having new and improved means for inducing evaporation of moisture introduced into an air stream.

More specifically, it is an object of my invention to provide a new and improved baffle device for an air stream into which moisture is introduced, and to provide a baffle device for this purpose which is highly efficient in inducing evaporation of the moisture and yet one which is simple in construction and economical to manufacture.

The invention consists in the improved construction and combination of parts, to be more fully described hereinafter and the novelty of which will be particularly pointed out and distinctly claimed.

In the accompanying drawing, to be taken as a part of this specification, I have fully and clearly illustrated certain preferred embodiments of my invention, in which drawing—

Figure 1:
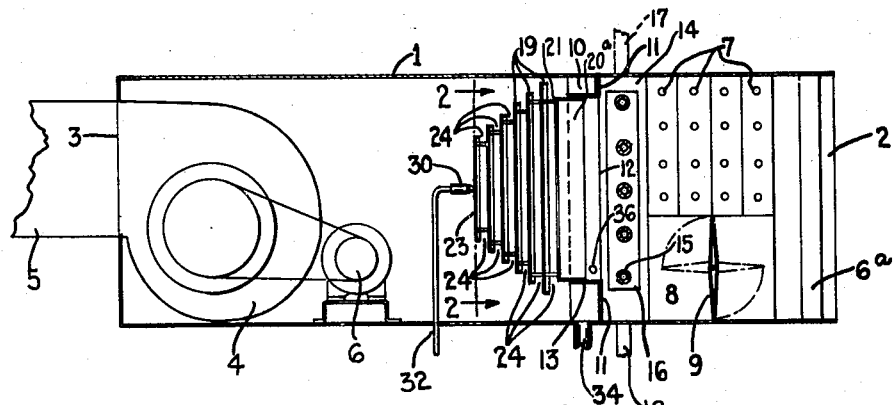
Figure 1 is a side view shown partly in cross section and partly in elevation of a humidifying apparatus embodying features of my invention.

Referring to the drawing by characters of reference, there is shown a humidifying apparatus which includes a housing or casing 1 which is preferably oblong or rectangular in shape, having an air inlet or intake 2 in one end of the housing and an air outlet 3 in the other end of the housing. The housing 1 may be arranged so that the intake 2 is in communication with the outdoor atmosphere. A suitable suction fan, enclosed within a casing 4, is provided for drawing air into the housing 1 and maintaining a continuous flow of air or a continuous air stream through the housing 1 during operation of the fan. In comunication with the outlet side of the fan casing 4 there may be provided a duct 5 into which the air, after being humidified, is discharged and through which it is propelled by the fan to a room or space (not shown) which is to be air conditioned. The fan may be of any suitable type, and preferably the encased fan is located within the housing 1 and adjacent the outlet end 3 thereof, as shown. The fan may be driven by any suitable source of power, such as for example, an electric motor indicated at 6 which is also preferably located within the housing 1 so as to provide a unitary, compact and neat appearing apparatus.

Within the housing 1 and preferably disposed adjacent the intake 2 there is an air filter, indicated generally at 6a, for cleansing the incoming air, and which may be of any well known suitable type. Within the housing 1, and preferably adjacent the inlet end 2, are cooling coils 7 which are preferably located adjacent the top wall of the casing with a space or passage 8 therebeneath constituting a by-pass for the passage of air and in which passage there may be located a damper 9 for controlling the volume of by-passed air. Within the housing 1 and between the fan and the cooling coils 7 there is provided a baffle device for inducing evaporation of moisture introduced into the air stream and this baffle device includes a supporting means in the form of a frame 10. The frame 10 has a flange or face 11 which is disposed substantially transverse to the side, top and bottom walls of the housing 1 and therefore transverse to the air stream passing through the housing, and the peripheral outer edge of the flange portion 11 engages the inner walls of the housing 1 thus closing the space between the frame opening 12 and the inner walls of the housing 1 to the passage of air. The frame 10 preferably has a body portion 13 in the form of a flange which defines the frame opening 12 and which extends from the frame portion 11 rearwardly or toward the outlet end of the housing 1. The frame 10 may be welded or otherwise suitably secured in place and to the walls of the housing 1. Located within the housing 1, and preferably adjacent the frame opening 12 there is provided a heating element arranged in the path of the air stream to heat the same to the proper temperature preparatory to the entraining of additional moisture introduced into the air stream.

The heating element may be of any suitable type, for example, it may consist of end header members 14 connected by pipes or a conduit 15 of sinuous form. Preferably, the end header members 14, of which only one is shown, are disposed against or adjacent opposite side walls of the housing 1 and outside of the frame opening 12 so as not to obstruct flow of air therethrough. The pipes or conduit 15 extend between the header members 14 in front of the frame opening 12 and therefor in the path of the air stream to heat the air at its entrance to the frame openings. Preferably, the heating element includes a plurality of fins, one of which is indicated at 16 and preferably the fins are arranged in planes substantially perpendicular to the face of the frame. The fins 16 are preferably arranged across and in front of the frame opening and adjacent to the frame. The pipes or conduit 15 extend through the fins 16, the fins providing a grille like structure having a large extended surface exposed to the air passing therethrough. Any suitable heating medium such as steam may be circulated through the heating element for heat transfer relation with the air. The heating medium may be conveyed from a source of supply to one of the header members 14 through a feed pipe 17 and be returned through a return pipe 18 leading from the other header member.

Disposed within the housing 1 and behind the frame opening 12 is the baffle structure which comprises a plurality of frame-shaped plate members 19 which are preferably connected and carried or supported as a unitary structure by the frame 10. The plates 19 extend substantially transverse to the top, bottom and side walls of the housing 1 and therefore extend substantially transverse to the air stream passing through the housing. The plates 19 may be secured together by pins 20 having shoulders for maintaining the plates in spaced relation or the plates may be secured together by means of bolts and nuts or by any other suitable securing means. The plates may be apertured to receive the pins, the ends of which may be peened over to rigidly secure the plates together.

The baffle device includes, in the present instance, an extension or supporting means 20ᵃ preferably a frame of rectangular or other form conforming to the flange 13 and which is disposed between the unitary baffle plate structure and the frame 10. The extension or supporting means 20ᵃ extends partway into the rear end of the frame body or flange 13 and is preferably formed to telescope snugly thereinto so that substantially no air can pass between the outer wall of the extension 20ᵃ and the inner wall of the flange 13. The extension 20ᵃ may be welded or otherwise suitably secured to the frame 10. The rear end of the extension 20ᵃ overhangs the rear end of the flange 13, in the present instance, and has an inturned flange preferably extending around its entire periphery providing a wall on which the baffle plate structure may be mounted. The inturned flange 21 may be apertured to receive the relatively longer spacers or pins which connect the adjacent first and second plates and which are utilized, in the present instance, to secure the unitary baffle structure to the extension 20ᵃ and therefore to the frame 10.

Figure 2:
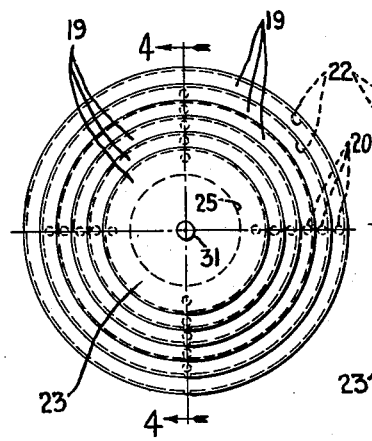
Fig. 2 is a rear view of my improved baffle device taken in the direction of the arrows 2—2 and shown removed from the humidifying apparatus.
Figure 3:
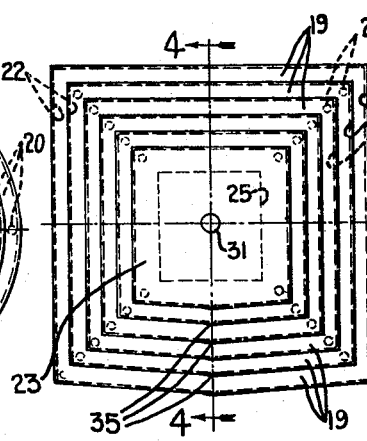
Fig. 3 is a view similar to Fig. 2 of a modified form of my baffle device.
Figure 4:
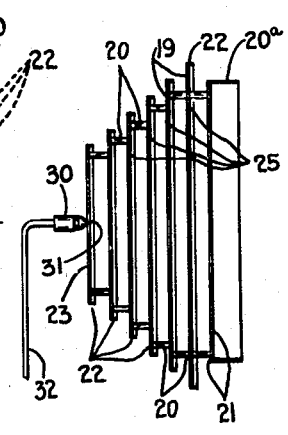
Fig. 4 is a view shown in cross section taken along the line 4—4 of Figs. 2 and 3.
Figure 5:
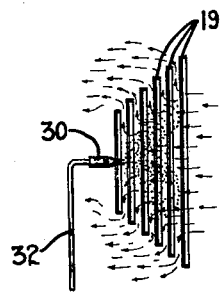
Fig. 5 is a view shown in cross section similar to Fig. 4 showing how the air is deflected by the baffle device.

The peripheral outer edges of plates of the same baffle structure preferably have the same general shape or contour which may be circular or square, as shown in Figs. 2 and 3 respectively or any other suitable shape. The plates 19 are also preferably arranged in concentric alignment and differ in size, that is, their respective circumferences or perimeters differ, and the rate of decrease in the sizes of the plates is preferably uniform so that the outer peripheral edges of the plates cooperate to form a tapered symmetrical contour. The unitary baffle structure is arranged within the housing 1 with the largest of the plates 19 disposed adjacent the frame 10, the plates successively decreasing in size from the largest plate to the smallest indicated at 23, or toward the outlet end of the housing 1. Each of the baffle plates 19 is provided with a centrally disposed opening 25 therethrough, the plates thus having the form of frame-shaped members with their openings concentrically aligned. In the present construction, the widths of the margin portions or borders of respective frame members 19 are substantially the same so that the openings 25 correspond to the sizes of the plates and decrease successively in size from the largest plate rearwardly. The inner edges, defining the openings 25 in the plates 19, cooperate to provide a tapered, symmetrical central passage which may be conical or pyramidal or other form. Thus, the plates 19, formed and relatively arranged, as above described, have central openings successively decreasing in size from the largest, constituting the inlet opening, to the smallest toward the rear of the baffle structure so that the marginal portions around the openings in successive plates overlap or project inwardly beyond preceding plates. By this arrangement, each plate has a central marginal portion around its opening which projects into the path of the air stream and against which air impinges and is diverted from the main stream and induced to flow over or between adjacent plates. The sides of adjacent plates cooperate to provide a plurality of passages extending substantially transverse to the main air stream, and because of the tapering form defined by cooperating outer edges or peripheries of the plates 19, the transverse passages have ring-like outlets 24 decreasing in size from the largest plate rearwardly so that the ring-like outlets lead out into different planes. Preferably, the outer edges of the plates 19 have flanges 22 around their entire peripheries and which extend toward the inlet end of the housing 1 when the baffle structure is in operative position therein.

Preferably, moisture is introduced into the air stream at the baffle plate structure and counter to the air stream, and to this end a spray nozzle 30 is provided and disposed within the housing 1 and arranged to discharge moisture through the plate openings 25, the last plate or plate 23 being closed to the passage of air but having a central aperture 31 through which the nozzle 30 sprays moisture through the plate openings. The nozzle 30 may be connected to a suitable source of water supply through the pipe 32. In the bottom wall of the housing 1 and beneath the baffle plate structure there is a drain pipe 34 for carrying off the excess water which drips from the baffle plates. If the baffle plate construction is rectangular in shape as shown in Fig. 3, the bottom flanges 22 of the plates 19 may be angularly disposed downwardly from the vertical sides to centrally located apexes to induce drainage of excess moisture from the plates. In the side wall of the frame 10, there is provided a drain opening 36 through which water tending to collect on the bottom wall of the frame is drained to the housing from whence it passes through drain pipe 34 to the sewer.

Figure 6:
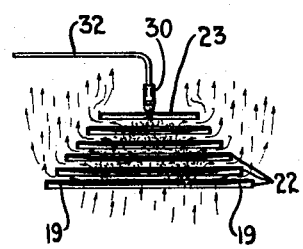
Fig. 6 is a view similar to Fig. 5 of a modified form of my baffle device.
Figure 7:
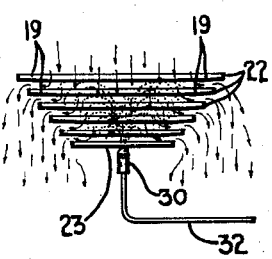
Fig. 7 is a view similar to Fig. 5 of still another form of my baffle device.

In Figs. 6 and 7, there are shown other baffle structures which are similar in structure to the baffle device described above but which are shown in different positions in which it may be desired to employ them. For example, in Fig. 6, the baffle structure is disposed with its inlet facing downwardly in which position the air stream will be directed upwardly into or against the baffle structure as indicated by the arrows. When the baffle structure is arranged in this manner, the frame-shaped plate members 19 are preferably slightly tapered from their outer peripheral edges inwardly and downwardly or toward the inlet to the baffle structure and along their entire peripheries. By forming the plates in this manner, it will be seen that the upwardly directed air will be induced by the conical formed surfaces of the frame members to flow between the plates and out of the ring-like outlets which air because of its tendency to rise might otherwise impinge against the central edge portion of the plates and flow back into the main air stream. The tapering frame members also induce moisture to drain therefrom. If the baffle structure is employed, as shown in Fig. 7 with its inlet facing upward, the frame-shaped members are preferably formed with a slight taper, tapering inwardly and downwardly along their entire peripheries so that moisture will drain therefrom. In the construction of Fig. 7 wherein the air is directed downwardly, the air after impinging against the exposed surfaces of the plates will tend to flow out of the ring-like outlets rather than back into the main stream because of the natural tendency of the relatively warm air to rise.

The operation of the humidifying device is as follows: The suction fan, in casing 4, operates to draw air into the housing 1 through intake 2 and maintain a continuous flow of air through the housing. As air enters the inlet 2 of the housing 1 it passes through the filter 6ª wherein impurities in the air are removed, the air then passing between the cooling coils 7 and through the by-pass 8 to the heating element. During the operation of the apparatus, as a humidifying apparatus, the cooling coils 7, of course, do not function to cool the incoming air, that is, the operation of the refrigerating apparatus (not shown) for refrigerating and circulating a cooling medium through coils 7 is discontinued. Before the air enters the baffle structure it passes over the heating element and the air is heated thereby to the proper temperature desired preparatory to increasing the moisture content of the air. As the relatively warm air now enters the baffle structure through the frame opening 14, it intermingles with the counter-directed moisture spray from the discharge nozzle 30. The moisture and air are thus mixed at the baffle structure and the moisture is picked up and carried along by the air stream. The main air stream tends to continue in its path through the housing under the influence of the suction fan and as it attempts to pass through the successively decreasing central openings 25 in the plates 19, it impinges against the overlapping central portions of the plates and the moisture carried by the air is broken up into a fine spray or mist which evaporates and is entrained by the air. The air is diverted from the main stream by the plates and is directed to flow over and between adjacent plates and flow out of the ring-like outlets 24 formed by the peripheral edges of adjacent plates. When the moisture laden air impinges against the plate surfaces, excess moisture carried by the air is deposited on the plate surfaces which are thereby maintained in a wet condition. Excess moisture will drip from the plates 22 and be drained from the housing 1 by means of the drain pipe 34.

It will be seen that the humidified air emerges from the baffle structure in a plurality of concentric streams in different planes. One of the advantages of a baffle structure of the character described is that the plates taken together present a large surface to the air stream while yet because of their arrangement whereby air flows out of a plurality of concentric openings it will be seen that a large volume of air per unit of time can be passed through the baffle structure.

During the summer months, or when dehumidified air is desired, the function of the heating element is discontinued and the cooling coils 7 are brought into function to cool the air, passing through the housing, to the temperature desired. The use of the moisture spray is, of course, also discontinued when the apparatus functions as a dehumidifying apparatus. Any suitable refrigerating apparatus may be employed to cool a cooling medium for circulation through the cooling coils 7. When the apparatus is employed as a dehumidifying apparatus, the damper 9 is preferably moved to closed position so that all of the air must pass over the cooling coils 7. As the air passes over the cooling coils, it is cooled thereby and some of its moisture is deposited on the cooling element, thus cooling and decreasing the moisture content of the air. The apparatus is suitable for both a humidifying apparatus and a dehumidifying apparatus because of the baffle construction which does not lower materially the volumetric capacity of the housing by reason of the series of air outlets leading out in different planes while yet it serves as an efficient air baffle for delaying the air at the wetted surfaces to entrain moisture when the apparatus is employed for humidifying purposes.

When the damper 9 is in closed position, closing the by-pass 8 to the passage of air, the entire air flow will be through the passage between the cooling coils, which will be minimum capacity, while if the damper is placed in open position or in a horizontal position as shown in dotted lines, a maximum volume of air will pass to the baffle structure so that by adjusting the damper 9 the volume of inflowing air may be regulated.

What I claim and desire to secure by Letters Patent of the United States is:

1. In a humidifying apparatus having a housing through which air flows and having a moisture supply means, a plurality of baffle plates disposed in spaced relation within said housing with the plates extending substantially transverse to the air stream, said plates successively decreasing in size and having aligned openings decreasing in size with the opening in the largest plate constituting the inlet opening, the periphery of said largest plate extending to the inner wall surface of the housing to close the space between the largest plate opening and the inner wall surface of said housing to the passage of air, said moisture supply means being positioned to introduce moisture at the smallest of said plates and in a direction counter to the air stream.

2. In a humidifying apparatus having a housing through which air flows and an inlet and an outlet for the air, a moisture supply means, a plurality of spaced baffle plates disposed within said housing and extending substantially transverse to the air stream, said baffle plates having flow apertures therethrough and having flange portions along their outer peripheries extending toward said air inlet counter to the direction of flow of the air.

3. In a humidifying apparatus having a housing for the passage of air therethrough and moisture supply means for introducing moisture into the air stream, a frame disposed within said housing transverse to the air stream and having an opening for the passage of air therethrough, a baffle device disposed behind the frame opening for inducing evaporation of the moisture into the air stream, and heating means disposed within the housing and extending across the frame opening for heating the air at the entrance to said baffle structure.

4. A baffle structure for disposition in the path of an air stream, comprising a plurality of frame-shaped members arranged in substantially parallel spaced relation, the openings in successive frame members being concentric and decreasing in size with the largest of said openings constituting the inlet opening, the outer peripheries of said frame-shaped members having flanges therearound and extending in a direction opposite to the direction of flow of the air stream.

5. A humidifying apparatus comprising a housing having an air outlet and an air inlet for the passage of an air stream therethrough, an air filter disposed within the housing adjacent the air inlet for cleansing the incoming air, a baffle structure disposed within the housing in the path of the air stream, heating means disposed within said housing and at the entrance to said baffle structure, and means disposed within the housing between the outlet thereof and the baffle structure for introducing moisture into the air and counter to the direction of flow of the air stream.

6. A humidifying apparatus comprising a housing having an air intake at one end and an air outlet at the other end, a fan and drive means for the fan disposed within said housing adjacent the outlet end thereof for maintaining a continuous flow of air through the housing, an air filter disposed within the housing adjacent the intake for cleansing the incoming air, a unitary air baffle structure disposed within the housing between the fan and said filter, heating means within said housing between the baffle structure and said filter for heating the air to the desired temperature preparatory to the entraining of moisture, and means within the housing between the fan and said baffle structure for introducing moisture into the air stream.

7. A humidifying apparatus comprising a housing through which air flows, means for inducing air flow through said housing, a plurality of plate members disposed in said housing in spaced relation and extending substantially transverse to the air stream, said plate members having concentric openings therethrough decreasing in size from a relatively large opening constituting the inlet opening whereby border portions around the openings of successive plates overlap and extend into the air stream, said plates cooperating to provide a spray chamber, and a nozzle positioned to introduce moisture in a fine spray into said spray chamber, said moisture being introduced into said spray chamber at the smaller of said openings and counter to the air stream.

8. A humidifying apparatus comprising a housing through which air flows, means for inducing air flow through said housing, a plurality of plate members disposed in said housing in spaced relation and extending substantially transverse to the air stream, said plate members having concentric openings therethrough and decreasing in size from a relatively large opening constituting the inlet opening whereby border portions around the openings of successive plates overlap and extend into the air stream, said plates cooperating to provide a spray chamber, a nozzle positioned to introduce moisture in a fine spray into said spray chamber, said moisture being introduced into said spray chamber at the smaller of said openings and counter to the air stream, and heating means positioned at said inlet opening for heating the air entering said spray chamber.

9. In a humidifying apparatus, a plurality of spaced baffle plates having alined openings therethrough providing an air flow passage and spray chamber, the openings in successive plates decreasing in cross-sectional area in the direction of air flow so that a portion of each plate extends into said passage to deflect air outward from said passage, an end plate obstructing longitudinal air flow through said passage and having an aperture therethrough, and a spray nozzle cooperable with said aperture to spray liquid into said chamber counter to the direction of air flow so that the liquid will be intimately mixed in the chamber with the air flowing therethrough.

10. In a humidifying apparatus, a plurality of spaced baffle plates having openings therethrough providing an air flow passage and spray chamber, said plates having portions projecting into the path of the air stream for the impingement of air thereagainst and to deflect air outward from said passage, an end plate obstructing longitudinal air flow through said passage and having an aperture therethrough, and a nozzle cooperable with said aperture to spray liquid into said chamber counter to the direction of air flow so that the liquid will be intimately mixed in the chamber with the air flowing therethrough.

CLARK T. MORSE.